(12) United States Patent
Hou

(10) Patent No.: US 9,250,364 B2
(45) Date of Patent: Feb. 2, 2016

(54) OPTICAL IMAGING LENS

(71) Applicant: GENIUS ELECTRONIC OPTICAL CO., LTD., Taichung (TW)

(72) Inventor: Hsien-Chang Hou, Taichung (TW)

(73) Assignee: GENIUS ELECTRONIC OPTICAL CO., LTD. (TW)

( * ) Notice: Subject to any disclaimer, the term of this patent is extended or adjusted under 35 U.S.C. 154(b) by 7 days.

(21) Appl. No.: 14/191,136

(22) Filed: Feb. 26, 2014

(65) Prior Publication Data

US 2015/0116849 A1    Apr. 30, 2015

(30) Foreign Application Priority Data

Oct. 25, 2013    (CN) .......................... 2013 1 0512457

(51) Int. Cl.
*G02B 3/00* (2006.01)
*G02B 13/00* (2006.01)
*G02B 7/02* (2006.01)

(52) U.S. Cl.
CPC ........ *G02B 3/00* (2013.01); *G02B 7/021* (2013.01); *G02B 13/004* (2013.01); *G02B 13/0035* (2013.01)

(58) Field of Classification Search
CPC ............................. G02B 3/00; G02B 13/0015
See application file for complete search history.

(56) References Cited

U.S. PATENT DOCUMENTS

| | | | | |
|---|---|---|---|---|
| 4,662,717 A * | 5/1987 | Yamada et al. | ................ | 359/362 |
| 5,323,268 A * | 6/1994 | Kikuchi | ................ | G02B 3/005 |
| | | | | 359/653 |
| 8,102,610 B2 * | 1/2012 | Chen | ............................ | 359/819 |
| 2009/0225447 A1 * | 9/2009 | Chang | ............................ | 359/796 |
| 2009/0310235 A1 * | 12/2009 | Chen | ............................ | 359/819 |
| 2011/0279913 A1 * | 11/2011 | Watanabe | ..................... | 359/728 |
| 2014/0029114 A1 * | 1/2014 | Kim | ............................ | 359/709 |
| 2014/0254034 A1 * | 9/2014 | Lyu | ........................ | G02B 7/021 |
| | | | | 359/819 |

* cited by examiner

*Primary Examiner* — Darryl J Collins
(74) *Attorney, Agent, or Firm* — Baker & McKenzie LLP

(57) ABSTRACT

The present invention provides an optical imaging lens. The optical imaging lens comprises a lens barrel and several lens elements positioned therein. Each lens element has a lens portion and a peripheral portion formed around the lens portion and extending to the rim. The lens portion is formed with an object-side surface facing to the object side and an image-side surface facing to the image side for passing the light. One of the lens elements is an embedded lens element. The radius from the center to the rim of the embedded lens element is smaller than that of another lens element adjacent to the embedded lens element and thus the rim of the embedded lens element is embedded in the peripheral portion of the adjacent lens element.

13 Claims, 7 Drawing Sheets

OPTICAL IMAGING LENS

INCORPORATION BY REFERENCE

This application claims priority from P.R.C. Patent Application No. 201310512457.6, filed on Oct. 25, 2013, the contents of which are hereby incorporated by reference in their entirety for all purposes.

TECHNICAL FIELD

The present invention relates to a mobile device and an optical imaging lens thereof, and particularly, relates to a mobile device applying an optical imaging lens.

BACKGROUND

The ever-increasing demand for smaller sized mobile devices, such as cell phones, digital cameras, etc. correspondingly triggered a growing need for a smaller sized photography module, comprising elements such as an optical imaging lens, a module housing unit, and an image sensor, etc., contained therein. Size reductions may be contributed from various aspects of the mobile devices, which includes not only the charge coupled device (CCD) and the complementary metal-oxide semiconductor (CMOS), but also the optical imaging lens mounted therein. When reducing the size of the optical imaging lens, however, achieving good optical characteristics becomes a challenging problem.

Please refer to FIG. 1, which shows the structure of traditional lens elements 121, 122, 123, 124 in a traditional optical imaging lens 1. For meeting the aforesaid requirement of reducing the thicknesses of the lens elements, the traditional lens elements 121, 122, 123, 124 are shaped in great diameter and finest thickness. Each of the traditional lens elements 121, 122, 123, 124, positioned in a lens barrel 11 without contacting with each other, has a lens portion for passing imaging light and a peripheral portion formed around the lens portion and extending to the rim of the lens element. As shown in FIG. 1, the lens portions 121A, 122A, 123A, 124A is formed with concave and/or convex shape for generating predetermined optical effect, and the thicknesses of the peripheral portions 121B, 122B, 123B, 124B at the outside of the lens portions 121A, 122A, 123A, 124A are quite thin. Forming the thickness such thin in the place which is near the rim will be a great challenge in the manufacture procedure. Thus, in the reality, the peripheral portions 121B, 122B, 123B, 124B are easily to get broken when the lens elements 121, 122, 123, 124 are removed from the molds, and consequently, the yield will be decreased.

Therefore, there is needed to lower the possibility of breaking lens elements in the manufacturing procedure and develop lens elements, with a slim size, while also having good optical characters.

SUMMARY

An object of the present invention is to provide an optical imaging lens comprising a plurality of lens elements, in which one of the lens elements therein are formed with a reduced radius. With positioning these lens elements with different radius in a lens barrel and accommodating the rim of the lens elements at different heights, the thicknesses of the lens elements are able to be thickened. Therefore, the lens elements are less likely to get broken in the manufacturing procedure and with a slim size.

Another object of the present invention is to provide good optical characters for an optical imaging lens comprising a plurality of lens elements through embedding the rim of the embedded lens element with smaller radius in the peripheral portion of the adjacent lens element with greater radius and fixing the embedded lens element on the adjacent lens element.

In an exemplary embodiment, an optical imaging lens comprises a lens barrel and a plurality of lens elements, positioned in the lens barrel. Each of the lens elements has a lens portion and a peripheral portion formed around the lens portion and extending to the rim of the lens element. The lens portion is formed with an object-side surface facing to the object side and an image-side surface facing to the image side for passing the light. One of the lens elements is an embedded lens element. The radius from the center to the rim of the embedded lens element is smaller than that of another lens element adjacent to the embedded lens element and the rim of the embedded lens element is embedded in the peripheral portion of the adjacent lens element.

In an example of the invention, the object-side surfaces and image-side surfaces of the lens elements are formed with concave and/or convex shape for generating predetermined optical effect, and the peripheral portion of a lens element, such as the adjacent lens element, is fixed on the lens barrel to fix the lens elements in the lens barrel.

In an example of the invention, the embedded relation between the rim of the embedded lens element and the peripheral portion of the adjacent lens element is achieved through the contact of a certain corresponding structures, such as, a perpendicular angle, a chamfering angle, a round corner or an inclined plane formed on the rim of the embedded lens element for contacting with a corresponding inclined plane formed on the peripheral portion of the adjacent lens element. Further, the inclined plane formed at the peripheral portion of the adjacent lens element is preferred to be symmetrical with respect to an optical axis. In another example of the invention, the above embedded relation can be achieved by forming a protruding portion on one of the rim of the embedded lens element and the peripheral portion of the adjacent lens element and a plane corresponding to the protruding portion on the other one of the rim of the embedded lens element and the peripheral portion of the adjacent lens element for contacting the rim of the embedded lens element with the peripheral portion of the adjacent lens element. However, the present invention is not limited to these examples; the other types of structures, shapes could be utilized for achieving the embedded relation.

In an example of the invention, the radius and position of a further lens element, a third lens element, can be adjusted for accommodating the rims of more lens elements in different heights and leaving more space for increasing the thicknesses of peripheral portion of the lens elements. This can be implemented in different ways, such as adding a third lens element positioned adjacent to the other side of the adjacent lens element other than the side adjacent to the embedded lens element, forming the radius from the center to the rim of the third lens element smaller than that of the adjacent lens element, and embedding the rim of the third lens element in the peripheral portion of the adjacent lens element; or adding a third lens element positioned adjacent to the other side of the embedded lens element other than the side adjacent to the adjacent lens element, forming the radius from the center to the rim of the embedded lens element smaller than that of the third lens element, and embedding the rim of the embedded lens element in the peripheral portion of the third lens element.

Please note that the position of the embedded lens element with smaller radius than that of the adjacent lens element is not strictly limited. For example, the embedded lens element may be positioned as the first, second, third or in the other order among all lens elements next to an entrance of light and in the order sequentially from the object side to the image side.

In an example of the invention, other elements or parts may be incorporated in the optical imaging lens, such as a filter for absorbing light with specific wavelength (for example, IR light) from the imaging light, a module housing unit for positioning the lens barrel, an image sensor positioned at the image side of the optical lens elements, and so on.

Through controlling the radius of the lens element(s) in the lens barrel to embed the lens element with smaller radius in the adjacent lens element with greater radius, the thicknesses of the peripheral portions of these lens elements are increased to effectively promote the yield of the lens elements in the manufacturing procedure.

BRIEF DESCRIPTION OF THE DRAWINGS

Exemplary embodiments will be more readily understood from the following detailed description when read in conjunction with the appended drawing, in which.

DETAILED DESCRIPTION

For a more complete understanding of the present disclosure and its advantages, reference is now made to the following description taken in conjunction with the accompanying drawings, in which like reference numbers indicate like features. Persons having ordinary skill in the art will understand other varieties for implementing example embodiments, including those described herein. The drawings are not limited to specific scale and similar reference numbers are used for representing similar elements. As used in the disclosures and the appended claims, the terms "example embodiment," "exemplary embodiment," and "present embodiment" do not necessarily refer to a single embodiment, although it may, and various example embodiments may be readily combined and interchanged, without departing from the scope or spirit of the present invention. Furthermore, the terminology as used herein is for the purpose of describing example embodiments only and is not intended to be a limitation of the invention. In this respect, as used herein, the term "in" may include "in" and "on", and the terms "a", "an" and "the" may include singular and plural references. Furthermore, as used herein, the term "by" may also mean "from", depending on the context. Furthermore, as used herein, the term "if" may also mean "when" or "upon", depending on the context. Furthermore, as used herein, the words "and/or" may refer to and encompass any and all possible combinations of one or more of the associated listed items.

Figure 1:
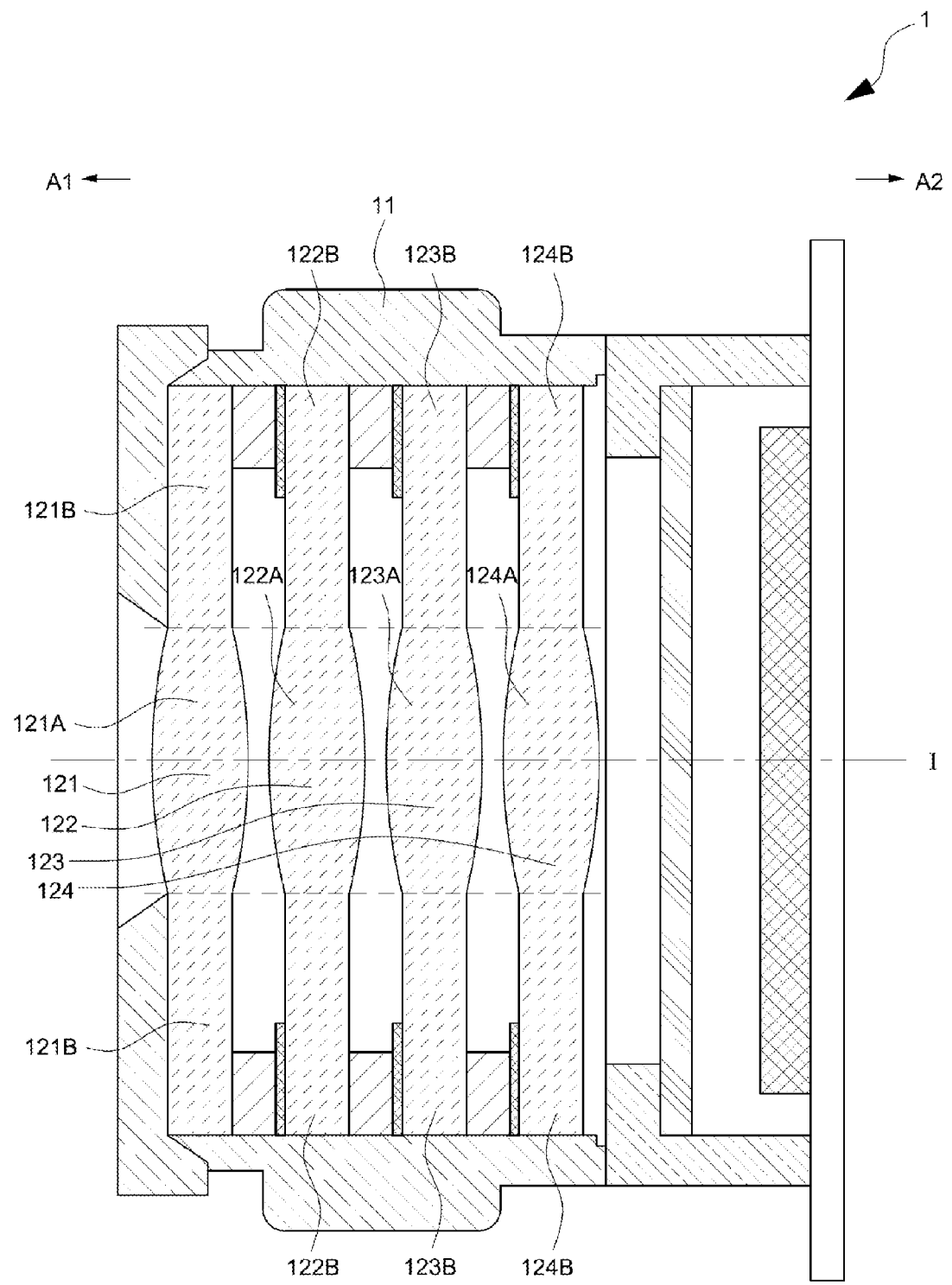
FIG. 1 is a cross-sectional view of a traditional optical imaging lens.
Figure 2:
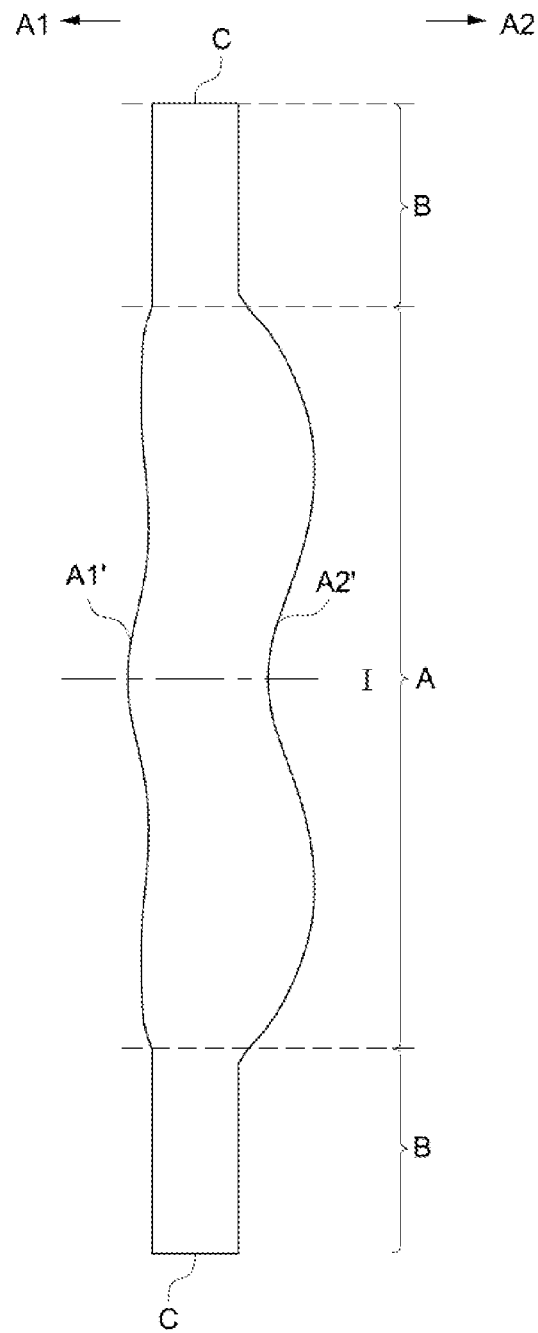
FIG. 2 is a cross-sectional view of a embodiment of a lens element according to the present disclosure.

Taking FIG. 2 for example, the lens element in the present invention shown therein has a lens portion A and a peripheral portion B formed around the lens portion A and extending to the rim C of the lens element. The lens portion A is formed with an object-side surface A1' facing to the object side A1 and an image-side surface A2' facing to the image side A2 for passing the light. One of the lens elements is an embedded lens element. For generating predetermined optical effect, the object-side surfaces A1' and image-side surfaces A2' of the lens portion A in the lens elements are formed with a certain concave and/or convex shape. What is shown in FIG. 2 is for example, which is not intended for limiting the present invention. For further promoting the imaging quality, more finest and polished concave and/or convex shape could be further formed to make different curvature of radius in the vicinity of the optical axis I and periphery of the lens portion A to adjust chief ray and marginal ray respectively. The peripheral portion B is preferably integrated with the lens portion A for getting fixed on the lens barrel for fixedly positioning the lens elements.

In the present invention, examples of an optical imaging lens comprising a lens barrel and a plurality of lens elements are provided. Through controlling the radius of the lens element(s) in the lens barrel to embed the lens element with smaller radius in the adjacent lens element with greater radius, the thicknesses of the peripheral portions of these lens elements are increased to effectively promote the yield of the lens elements in the manufacturing procedure.

Please note that the position of the embedded lens element with smaller radius than that of the adjacent lens element is not strictly limited. For example, the embedded lens element may be positioned as the first, second, third or in the other order among all lens elements next to an entrance of light 211 (shown in FIG. 3) and in the order sequentially from the object side to the image side.

Preferably, the radius and position of a further lens element, a third lens element, can be adjusted for accommodating the rims of more lens elements in different heights and leaving more space for increasing the thicknesses of peripheral portion of the lens elements. This can be implemented in different ways, such as adding a third lens element positioned adjacent to the other side of the adjacent lens element other than the side adjacent to the embedded lens element, forming the radius from the center to the rim of the third lens element smaller than that of the adjacent lens element, and embedding the rim of the third lens element in the peripheral portion of the adjacent lens element; or adding a third lens element positioned adjacent to the other side of the embedded lens element other than the side adjacent to the adjacent lens element, forming the radius from the center to the rim of the embedded lens element smaller than that of the third lens element, and embedding the rim of the embedded lens element in the peripheral portion of the third lens element.

Figure 3:
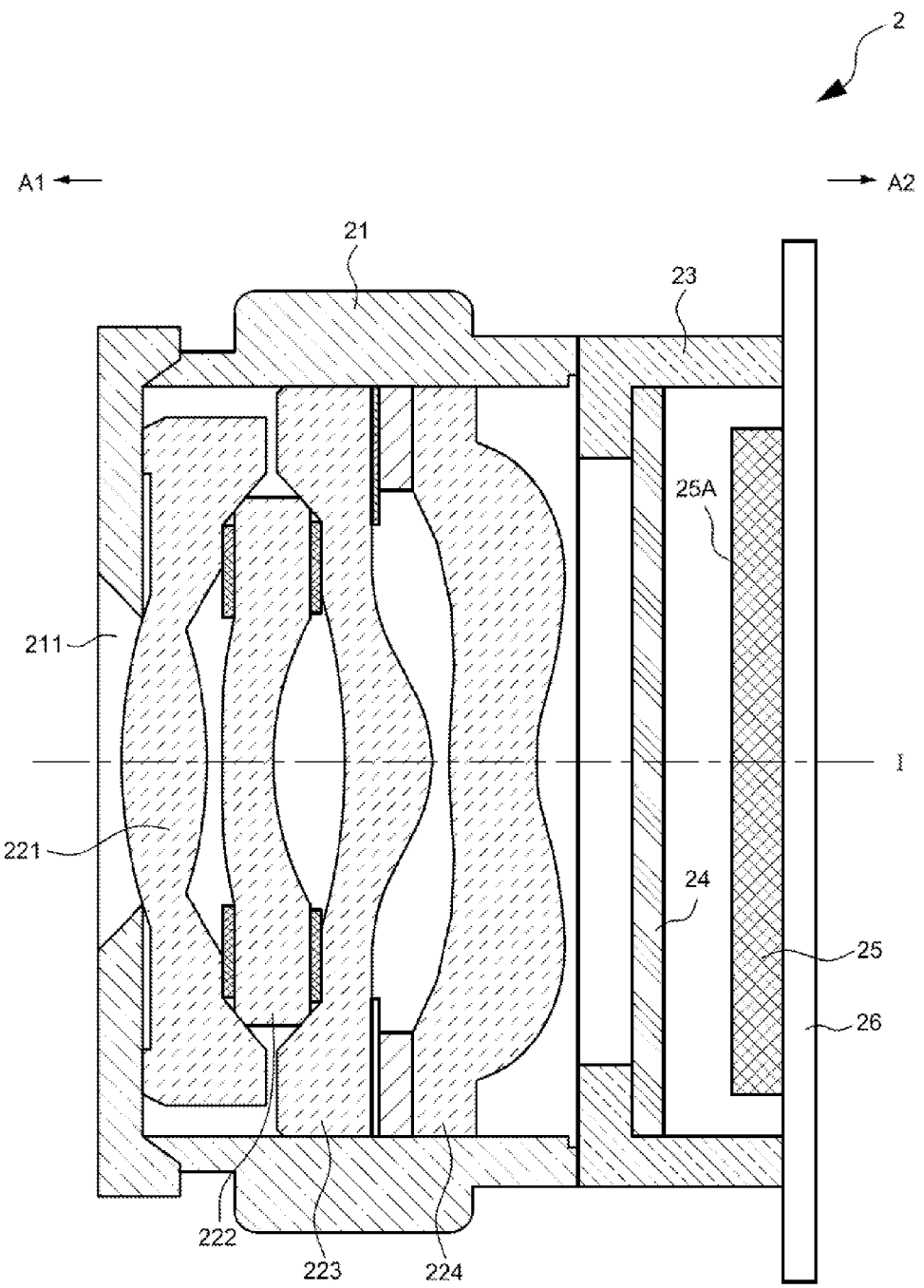
FIG. 3 is a cross-sectional view of a first embodiment of an optical imaging lens according to the present disclosure.
Figure 4:
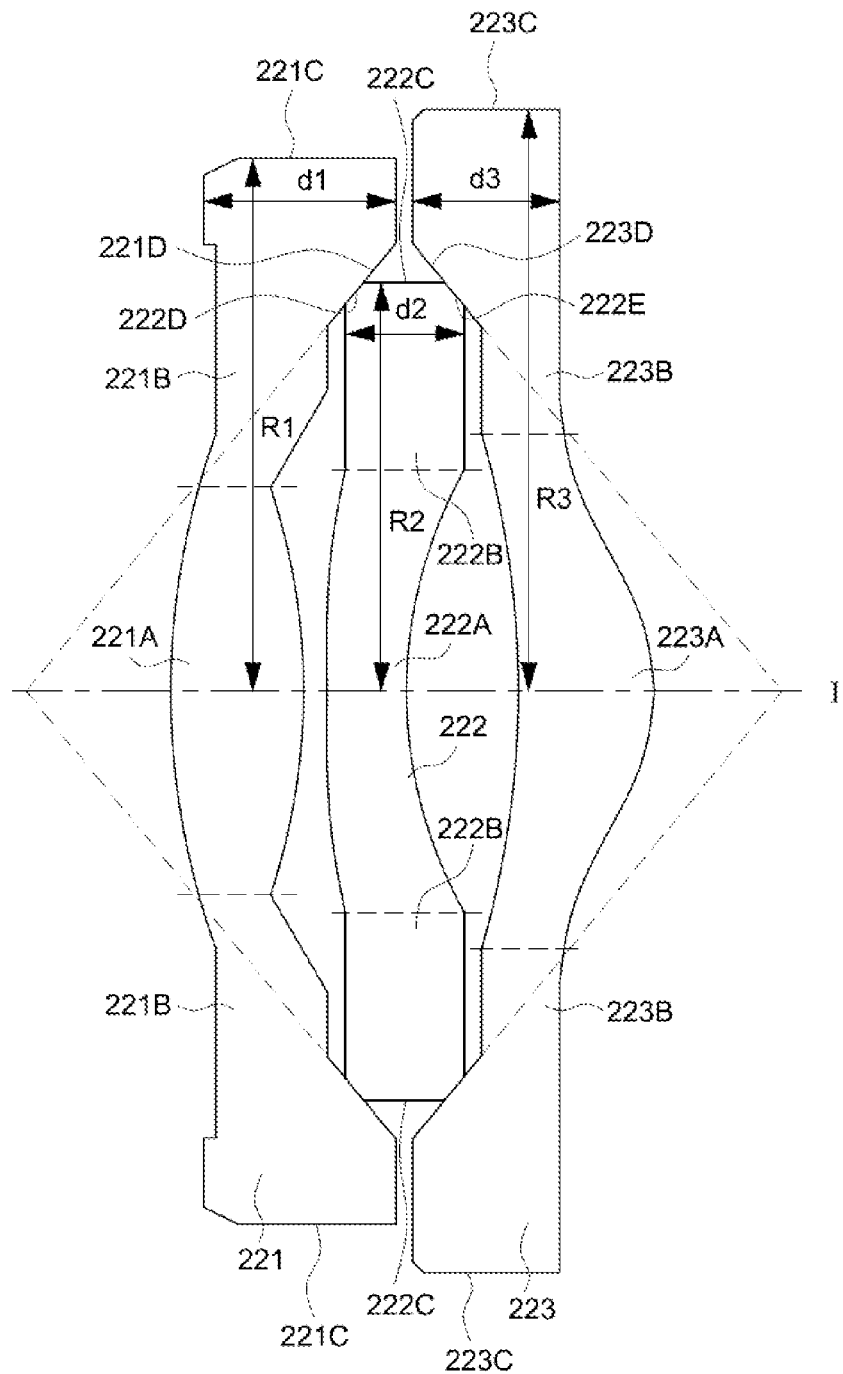
FIG. 4 is a cross-sectional view of a part of lens elements shown in FIG. 3.

Several exemplary embodiments and associated optical data will now be provided for illustrating example embodiments of optical imaging lens with increased thickness in the peripheral portion. Reference is now made to FIGS. 3-4. FIG. 3 is a cross-sectional view of a first embodiment of an optical imaging lens 2 according to the present disclosure. FIG. 4 is a cross-sectional view of a part of lens elements shown in FIG. 3. As shown in FIG. 3, the optical imaging lens 2 of the present embodiment may be applied in but not limited to, a mobile phone, a camera, a tablet computer, a personal digital assistant (PDA), etc. Here, for example the optical imaging lens 2 is a prime lens comprising a lens barrel 21, a module housing unit 23 for positioning the lens barrel 21, and a substrate 26 for positioning the module housing unit 23. In the lens barrel 21, in order from an object side A1 to an image side A2 along an optical axis, a first lens element 221, a second lens element 222, a third lens element 223 and a fourth lens element 224 are positioned. Please note that the total number as well as the concave/convex shape of the lens elements here is only for example. A filtering unit 24 is positioned in the module housing unit 23 and an image sensor 25 is positioned on the substrate 26. The example embodiment of the filtering unit 24 illustrated is an IR cut filter (infrared cut filter) positioned between the fourth lens element 224 and an image plane 25A of the image sensor 25. The filtering unit 24 selectively absorbs light with specific wavelength from the light passing optical imaging lens 2. For example, IR light is absorbed, and this will prohibit the IR light which is not seen by human eyes from producing an image on the image plane 25A.

In some other example embodiments, the structure of the filtering unit 24 may be omitted. In some example embodiments, the lens barrel 21 and/or the module housing unit 23 may be integrated into a single component or assembled by multiple components. In some example embodiments, the image sensor 25 used in the present embodiment is directly attached to a substrate 26 in the form of a chip on board (COB) package, and such package is different from traditional chip scale packages (CSP) since COB package does not require a cover glass before the image sensor 25 in the optical imaging lens 2. Aforesaid exemplary embodiments are not limited to this package type and could be selectively incorporated in other described embodiments.

Exemplary embodiments of each lens element 221, 222, 223, 224 of the optical imaging lens 2 which may be constructed by plastic material, and in the former three lens elements 221, 222, 223, the thickness of the peripheral portions 221B, 222B, 223B are increased through embedding the embedded lens element 222 at the center both in the adjacent lens elements 221, 223.

As shown in FIG. 4, each of the three lens elements 221, 222, 223 has a lens portion 221A, 222A, 223A and a peripheral portion 221B, 222B, 223B extending in different radial ranges. The second lens element 222 is an embedded lens element for the radius R2 from the center of the second lens element 222, such as from the optical axis I, to the rim 222C is smaller than the radiuses R1, R3 of the first and third lens elements 221, 223 adjacent to the second lens element 222, which are the distances from the center of the lens elements 221, 223, such as from the optical axis I, to the rim 221C, 223C. The rim 222C of the second lens element 222 is embedded in the peripheral portions 221B, 223B of the first and third lens elements 221, 223 through inclined planes 222D, 222E formed on the rim 222C contacting with an inclined plane 221D formed on the peripheral portion 221B of the first lens element 221 and an inclined plane 223D formed on the peripheral portion 223B of the third lens element 223 respectively. Here, the inclined planes 222D, 222E, 221D, 223D are symmetric with respect to the optical axis I, and this geometrical design in the inclined planes 222D, 222E, 221D, 223D makes the optical axis of the second lens element 222 coaxial with the optical axis I of the optical imaging lens 2 to reduce the error of each lens element 221, 222, 223 and facilitate the assembly process.

Please note that the inclined planes 222D, 222E can be replaced by a perpendicular angle, a chamfering angle or a round corner for contacting with the inclined planes 221D, 223D of the adjacent first and third lens elements 221, 223.

By shrinking the radius of the second lens element 222, the rim 221C, 222C, 223C of the lens elements 221, 222, 223 are accommodated at different heights which are related to the radiuses of the lens elements 221, 222, 223 in the lens barrel 21. Therefore, the total number of the peripheral portions 221B, 222B, 223B in the same height is reduced and then more space is left for increasing the thicknesses of the peripheral portions 221B, 222B, 223B without increasing the total length of the optical imaging lens 2. As shown in FIG. 4, the maximum thickness of the peripheral portion 221B is d1, the maximum thickness of the peripheral portion 222B is d2 and the maximum thickness of the peripheral portion 223B is d3. Because the second lens element 222 is embedded in both the first and third lens elements 221, 223, the thicknesses of the peripheral portion 221B, 223B of the first and third lens elements 221, 223 is greater than the maximum thickness d2 of the peripheral portion 222B of the second lens element 222.

Additionally, since the radius of the lens element 222 is reduced, the peripheral portion 222B will be less likely to get broken in the manufacturing procedure. Thus, the peripheral portion 221B, 222B, 223B of the lens elements 221, 222, 223 are less likely to get broken in the manufacturing procedure and with a slim size.

In the present embodiment, the lens elements 221, 222, 223 are fixed to the lens barrel 21 through the third lens element 223 having the longest radius fixing on the lens barrel 21. Thus, the second lens element 222 having the smaller radius can be fixed for sustain the great optical characteristics of the optical imaging lens 2 through the third lens element 223 having the greater radius. However, this is only for example, and in the other embodiment, other mechanism for fixing, such as adding more structural details in the lens barrel, adding more element for fixing, etc. could be utilized.

Figure 5:
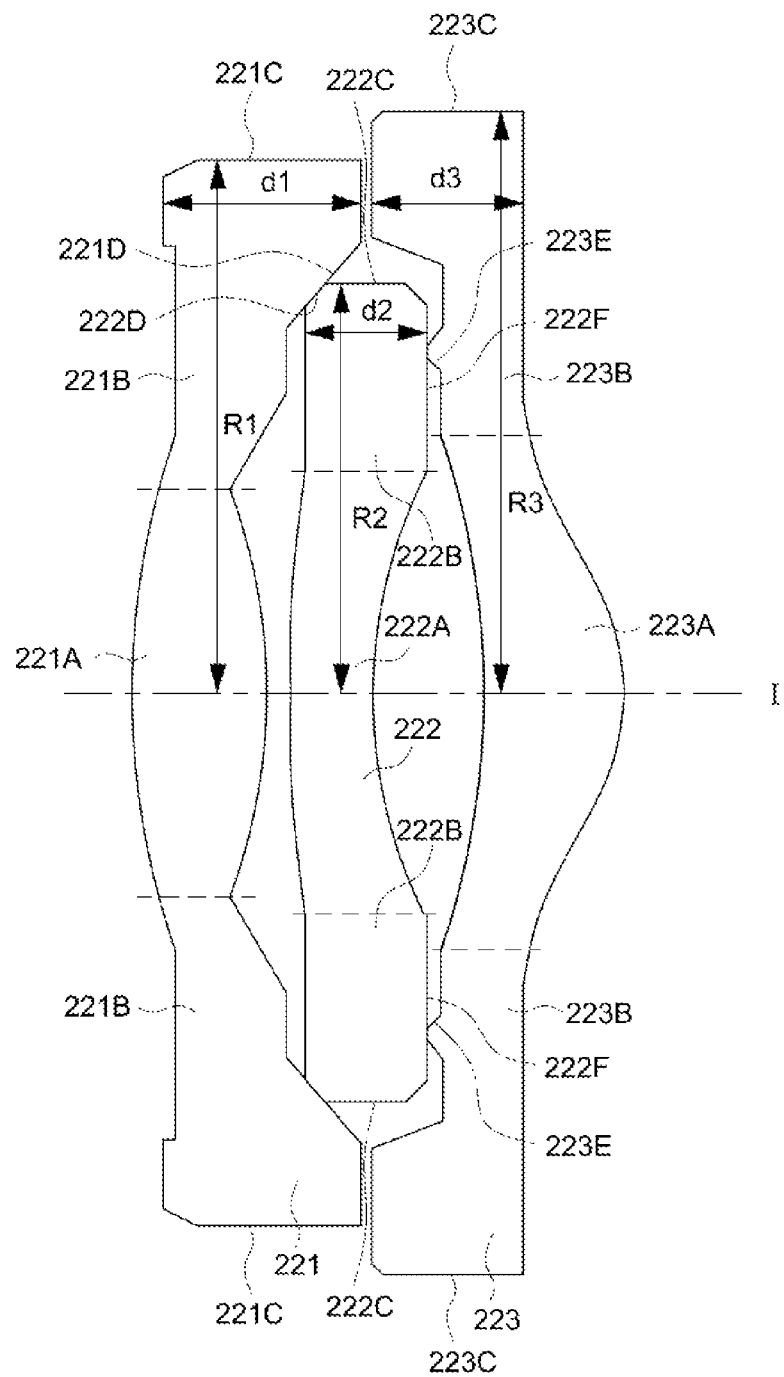
FIG. 5 is a cross-sectional view of a second embodiment of a part of lens elements of an optical imaging lens according to the present disclosure.

Please refer to FIG. 5, which shows a cross-sectional view of a second embodiment of a part of lens elements of an optical imaging lens according to the present disclosure. The reference numbers labeled in the present embodiment are similar to those in the first embodiment for the similar elements, and some structure is omitted here. For the details of the omitted structure, please refer to FIG. 3.

The differences between the present and first embodiments are: the embedded relation between the second and third lens elements 222, 223 are achieved by a protruding portion 223E formed on the peripheral portion 223B of the third lens element 223 contacting with a plane 222F formed on the peripheral portion 222B of the second lens element 222. Please note that the position of the plane 222F and corresponding protruding portion 223E can be altered between the second and third lens element 222, 223. For example, a protruding portion may be formed on one of the peripheral portion of the embedded lens element having a smaller radius or the peripheral portion of the embedded lens element having a greater radius, and a corresponding plane is formed on the other of the peripheral portion of the embedded lens element having a smaller radius or the peripheral portion of the embedded lens element having a greater radius. Thus, the protruding portion may be formed on the peripheral portion 222B of the second lens element and the plane may be formed on the peripheral portion 223B of the third lens element 223. However, the present invention is not limited to the examples, the other types of structure having various kinds of shape, position may be utilized for embedding the lens element.

Figure 6:
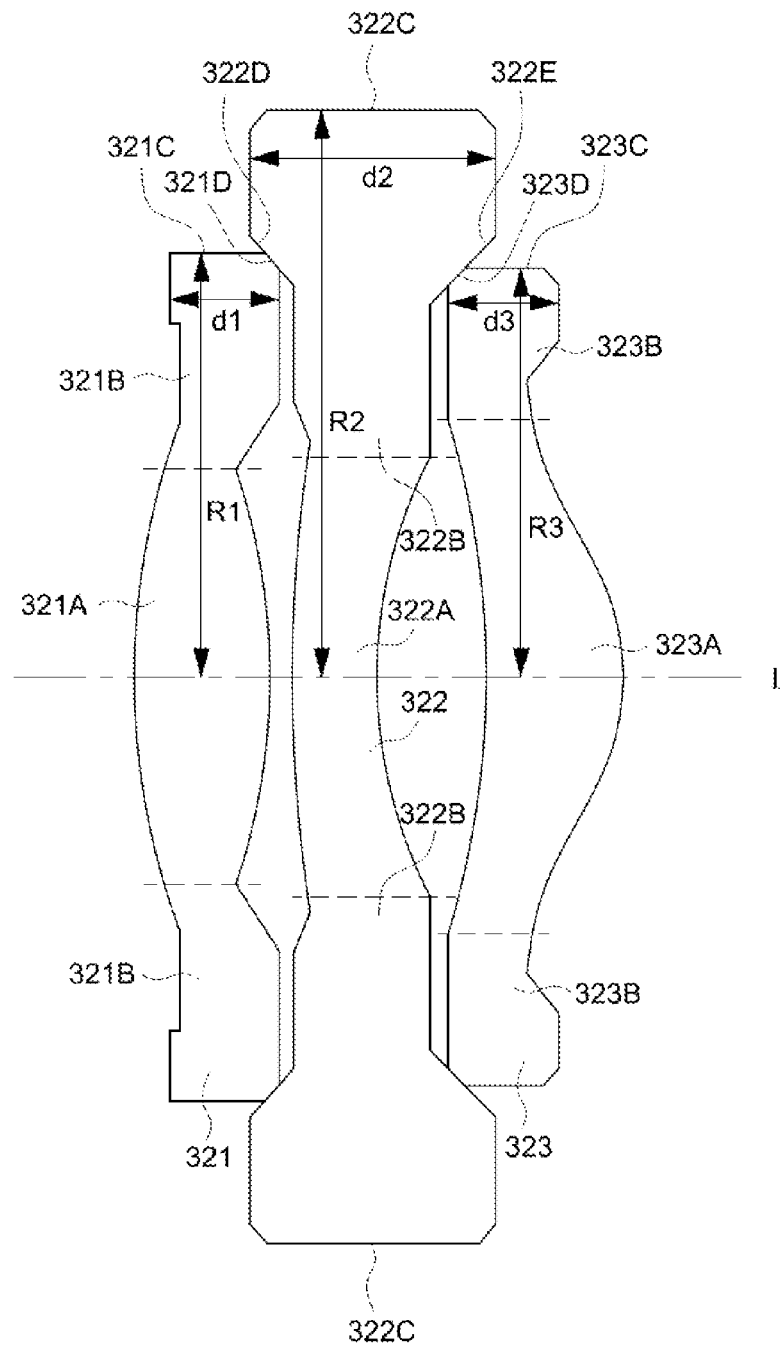
FIG. 6 is a cross-sectional view of a third embodiment of a part of lens elements of an optical imaging lens according to the present disclosure.

Please refer to FIG. 6, which shows a cross-sectional view of a third embodiment of a part of lens element of an optical imaging lens according to the present disclosure. The reference numbers labeled in the present embodiment are similar to those in the first embodiment for the similar elements, and some structure is omitted here. For the details of the omitted structure, please refer to FIG. 3.

The thickness of the peripheral portions 321B, 322B, 323B are increased through embedding the both embedded lens elements 321, 323 in the central lens element 322.

As shown in FIG. 6, each of the three lens elements 321, 322, 323 has a lens portion 321A, 322A 323A and a peripheral portion 321B, 322B, 323B extending in different radial ranges. The first and third lens elements 321, 323 are embedded lens elements for the radius R1, R3 from the center of the first or third lens element 321/323, such as from the optical axis I, to the rim 321C/323C is smaller than the radiuses R2 of the second lens element 322 adjacent to the first and third lens element 321, 323, which is the distance from the center of the lens element 322, such as from the optical axis I, to the rim 322C. The rim 321C of the first lens element 321 is embedded in the peripheral portion 322B of the second lens elements 322 through inclined planes 321D formed on the rim 321C contacting with inclined planes 322D formed on the peripheral portion 322B of the second lens element 322; and the rim 323C of the third lens element 323 is embedded in the peripheral portion 322B of the second lens elements 322 through inclined plane 323D formed on the rims 323C contacting with inclined planes 322E formed on the peripheral portion 322B of the second lens element 322. Here, the inclined planes 321D, 322D, 322E, 323D are symmetric with respect to the optical axis I, and this geometrical design in the inclined planes 321D, 322D, 322E, 323D makes the optical axes of the first and third lens elements 321, 323 coaxial with the optical axis I of the optical imaging lens 2 to reduce the error of each lens element 321, 322, 323 and facilitate the assembly process.

Please note that the inclined planes 321D, 323D can be replaced by a perpendicular angle, a chamfering angle or a round corner for contacting with the inclined planes 322D, 322E of the adjacent second lens element 322.

By shrinking the radius of the first and third lens elements 321, 323, the rim 321C, 322C, 323C of the lens elements 321, 322, 323 are accommodated at different heights which are related to the radiuses of the lens elements 321, 322, 323 in the lens barrel 21. Therefore, the total number of the peripheral portions 321B, 322B, 323B in the same height is reduced and then more space is left for increasing the thicknesses of the peripheral portions 321B, 322B, 323B without increasing the total length of the optical imaging lens 2. As shown in FIG. 6, the maximum thickness of the peripheral portion 321B is d1, the maximum thickness of the peripheral portion 322B is d2 and the maximum thickness of the peripheral portion 323B is d3. Because the first and third lens elements 321, 323 are embedded in the second lens element 322, the maximum thickness d2 of the peripheral portion 322B of the second lens element 322 is greater than the thicknesses of the peripheral portions 321B, 323B of the first and third lens elements 321, 323.

Additionally, since the radiuses of the lens element 321, 323 are reduced, the peripheral portions 321B, 323B will be less likely to get broken in the manufacturing procedure. Thus, the peripheral portion 321B, 322B, 323B of the lens elements 321, 322, 323 are less likely to get broken in the manufacturing procedure and with a slim size.

In the present embodiment, the lens elements 321, 322, 323 are fixed to the lens barrel 21 through the second lens element 322 having the longest radius fixing on the lens barrel 21. Thus, the first and third lens elements 321, 323 having the smaller radius can be fixed for sustain the great optical characteristics of the optical imaging lens 2 through the second lens element 322 having the greater radius. However, this is only for example, and in the other embodiment, other mechanism for fixing, such as adding more structural details in the lens barrel, adding more elements for fixing, etc. could be utilized.

Figure 7:
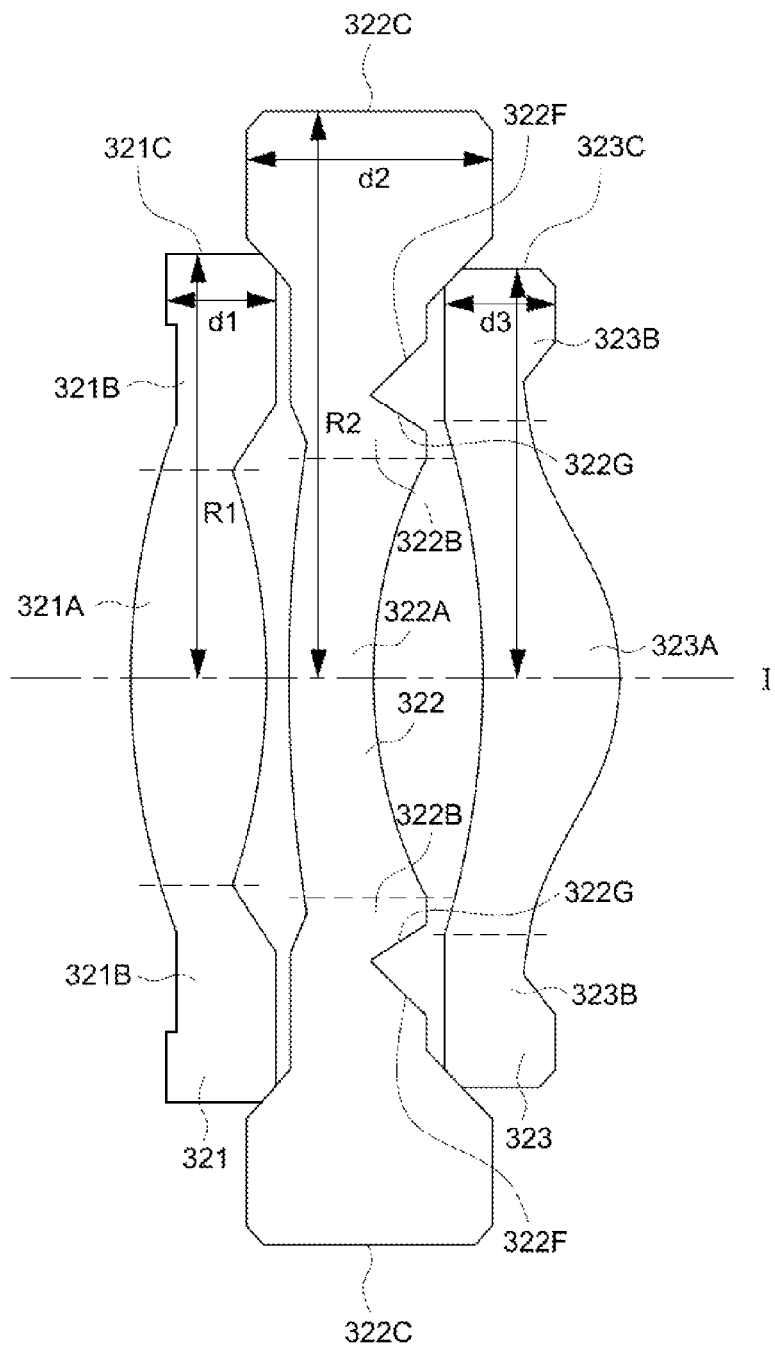
FIG. 7 is a cross-sectional view of a fourth embodiment of a part of lens elements of an optical imaging lens according to the present disclosure.

Please refer to FIG. 7, which shows a cross-sectional view of a fourth embodiment of a part of lens element of an optical imaging lens according to the present disclosure. The reference numbers labeled in the present embodiment are similar to those in the first embodiment for the similar elements, and some structure is omitted here. For the details of the omitted structure, please refer to FIG. 3.

The differences between the present and third embodiments are: the peripheral portion 322B of the second lens element 322 is formed with several inclined planes 322F, 322G to allow the occurrence of total reflection of stray light here and avoid from the entrance of the stray light onto the imaging plane to lower the imaging quality. Thus, through the design of the present embodiment, the good optical characteristics of the optical imaging lens is assured.

According to above illustration, it is clear that through controlling the radius of the lens element(s) in the lens barrel to embed the lens element with smaller radius in the adjacent lens element with greater radius, the thicknesses of the peripheral portions of these lens elements are increased to effectively promote the yield of the lens elements in the manufacturing procedure.

While various embodiments in accordance with the disclosed principles been described above, it should be understood that they are presented by way of example only, and are not limiting. Thus, the breadth and scope of exemplary embodiment(s) should not be limited by any of the above-described embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, a description of a technology in the "Background" is not to be construed as an admission that technology is prior art to any invention(s) in this disclosure. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:
1. An optical imaging lens, comprising:
  a lens barrel; and
  a plurality of lens elements, positioned in the lens barrel, wherein
  each of the lens elements has a rim, a center, a lens portion, and a peripheral portion formed around the lens portion and extending to the rim of the lens element, the lens portion is formed with an object-side surface facing an object side and an image-side surface facing an image side for passing the light, the lens elements comprises a first lens element, a second lens element, and a third lens element, the first lens element, the second lens element, and the third lens element are positioned sequentially from the object side to the image side, a radius measuring a distance from the center of the second lens element to the rim of the second lens element is smaller than that of the first lens element, the first lens element is adjacent to the object-side surface of the second lens element, the radius from the center of the second lens element to the rim of the second lens element is smaller than that of the third lens element, the third lens element is adjacent to the image-side surface of the second lens element, wherein the rim of the second lens element is embedded in the peripheral portions of the first and third lens element, the maximum thicknesses of the peripheral portions of the first and third lens elements are greater than the maximum thickness of the peripheral portion of the second lens element, and wherein the rim of the second lens element is formed with a perpendicular angle, a chamfering angle, a round corner or an inclined plane which is contacted with a corresponding inclined plane formed on the peripheral portion of the first lens element or the peripheral portion of the third lens element.

2. The optical imaging lens according to claim 1, wherein the inclined plane formed on the peripheral portion of the first lens element or the third lens element is symmetrical with respect to an optical axis.

3. The optical imaging lens according to claim 1, wherein the contact between the peripheral portion of the second lens element and the peripheral portion of the third lens element is achieved with a protruding portion and a plane which are respectively formed on peripheral portion of the third lens element and the peripheral portion of the second lens element.

4. The optical imaging lens according to claim 1, further comprising:
a module housing unit for positioning the lens barrel; and
an image sensor positioned at the image side of the lens elements.

5. The optical imaging lens according to claim 1, wherein the object-side surface and the image-side surface of at least one lens element are formed to have concave and/or convex shapes for generating a predetermined optical effect.

6. The optical imaging lens according to claim 1, wherein the contact between the peripheral portion of the second lens element with and the peripheral portion of the third lens element is achieved with a protruding portion and a plane which are respectively formed on the peripheral portion of the second lens element and the peripheral portion of the third lens element.

7. The optical imaging lens according to claim 1, wherein the periphery portions of the first lens element and the third lens element are fixed on the lens barrel.

8. An optical imaging lens, comprising:
a lens barrel; and
a plurality of lens elements, positioned in the lens barrel, wherein:
each of the lens elements has a rim, a center, a lens portion and a peripheral portion formed around the lens portion and till the rim of the lens element,
the lens portion is formed with an object-side surface facing to an object side and an image-side surface facing to an image side for passing the light,
the lens elements comprises a first lens element, a second lens element, and a third lens element, the first lens element, the second lens element, and the third lens element are positioned sequentially from the object side to the image side, and
the radius from the center of the first lens element to the rim of the first lens element is smaller than that of the second lens element, the first lens element is adjacent to the object-side surface of the second lens element, the radius from the center of the third lens element to the rim of the third lens element is smaller than that of the second lens element, the third lens element is adjacent to the image-side surface of the second lens element, and
the rims of the first lens element and the third lens element are embedded in the peripheral portions of the second lens elements, the maximum thickness of the peripheral portions of the second lens elements is greater than the maximum thicknesses of the peripheral portions of the first lens element and the third lens element.

9. The optical imaging lens according to claim 8, wherein the rim of the first lens element or the rim of the third lens element is formed with a perpendicular angle, a chamfering angle, a round corner or an inclined plane which is contacted with a corresponding inclined plane formed on the peripheral portion of the second lens element.

10. The optical imaging lens according to claim 9, wherein the inclined plane formed on the peripheral portion of the second lens element is symmetrical with respect to an optical axis.

11. The optical imaging lens according to claim 8, wherein further comprising: a module housing unit for positioning the lens barrel; and an image sensor positioned at the image side of the optical lens element.

12. The optical imaging lens according to claim 8, wherein the object-side surface and image-side surface are formed with concave and/or convex shape for generating predetermined optical effect.

13. The optical imaging lens according to claim 8, wherein the periphery portions of the second lens element is fixed on the lens barrel.

* * * * *